United States Patent [19]

Eggers et al.

[11] 4,424,662
[45] Jan. 10, 1984

[54] DRIVE APPARATUS FOR ROLL BALING MACHINE

[75] Inventors: Edward T. Eggers; John H. Freimuth; Richard E. Jennings, all of New Holland; Willis R. Campbell, Ephrata, all of Pa.

[73] Assignee: Sperry Corporation, New Holland, Pa.

[21] Appl. No.: 399,607

[22] Filed: Jul. 19, 1982

[51] Int. Cl.³ .................... A01D 39/00; B30B 5/06
[52] U.S. Cl. .................................. 56/341; 56/11.7; 100/88
[58] Field of Search .................. 56/11.5, 11.6, 11.7, 56/341; 100/88, 89, 5

[56] References Cited

U.S. PATENT DOCUMENTS

| 4,172,354 | 10/1979 | Vermeer et al. | 56/341 |
| 4,212,149 | 7/1980 | Krone et al. | 56/341 |
| 4,343,141 | 8/1982 | Oellig et al. | 100/88 |

FOREIGN PATENT DOCUMENTS

| 2818848 | 11/1979 | Fed. Rep. of Germany | 56/341 |
| 2045155 | 10/1980 | United Kingdom | 56/341 |

Primary Examiner—Gene Mancene
Assistant Examiner—John G. Weiss
Attorney, Agent, or Firm—Darrell F. Marquette; Larry W. Miller; Frank A. Seemar

[57] ABSTRACT

A roll baling machine including a floor roller, a bale forming apron, and drive apparatus connected between the floor roller and the bale forming apron. The drive apparatus causes rotation of the floor roller in response to movement of the apron in a normal direction during bale formation. The drive apparatus includes a clutch mechanism which drivingly disconnects the floor roller from the apron in response to movement of the apron in reverse direction such as when a bale is discharged from the machine.

5 Claims, 5 Drawing Figures

DRIVE APPARATUS FOR ROLL BALING MACHINE

This invention relates generally to roll baling machines typically referred to as "round balers" which form cylindrical roll bales of crop material.

The present invention provides a roll baling machine including a frame, a floor roller rotatably supported on the frame, and an apron supported on the frame cooperating with the floor roller to form a roll bale of crop material. The machine also includes drive means connected between the floor roller and the apron for rotating the floor roller in response to movement of the apron in a first direction during bale formation. The drive means includes clutch means for drivingly disconnecting the floor roller from the apron in response to movement of the apron in a second direction which is opposite the first direction. In its preferred embodiment, the clutch means includes a driving member connected to the apron and a driven member connected to the floor roller.

DESCRIPTION OF THE PREFERRED EMBODIMENT

Figure 1:
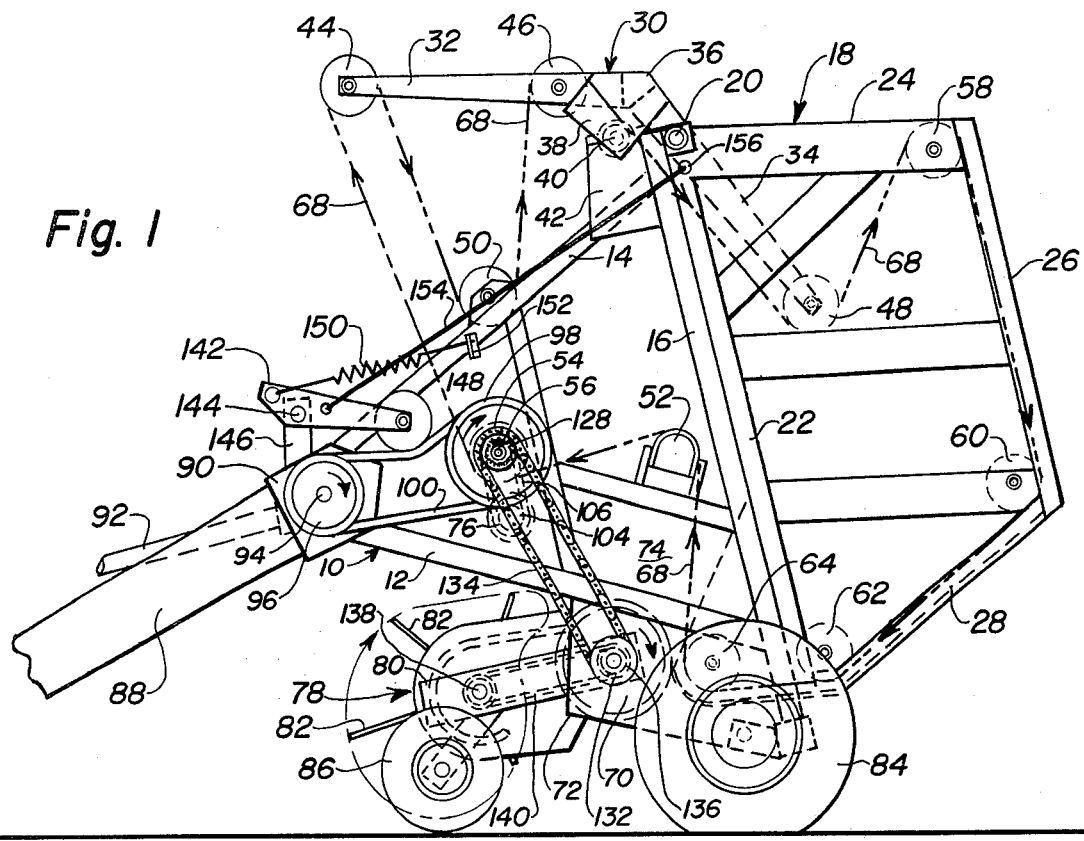
FIG. 1 is a side elevational view of a roll baling machine embodying the present invention taken when the machine is empty.
Figure 2:
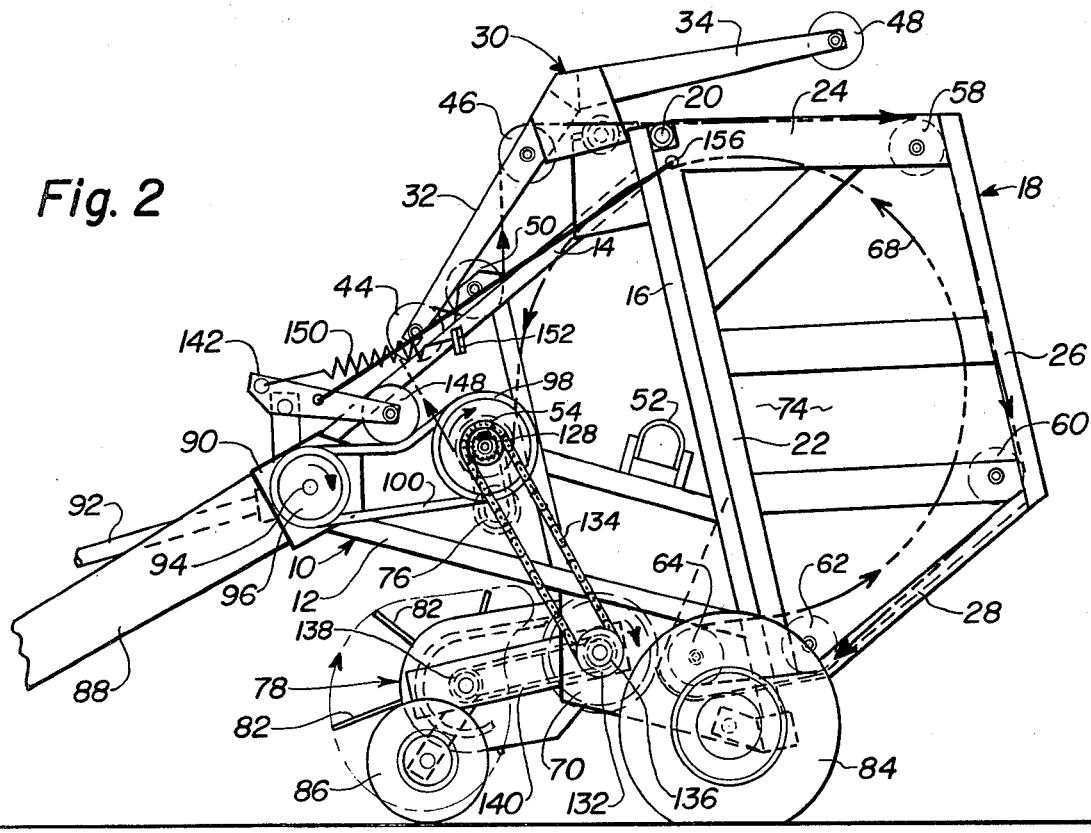
FIG. 2 is a side elevational view of the machine shown in FIG. 1 when a bale has been formed and is disposed in the machine.
Figure 3:
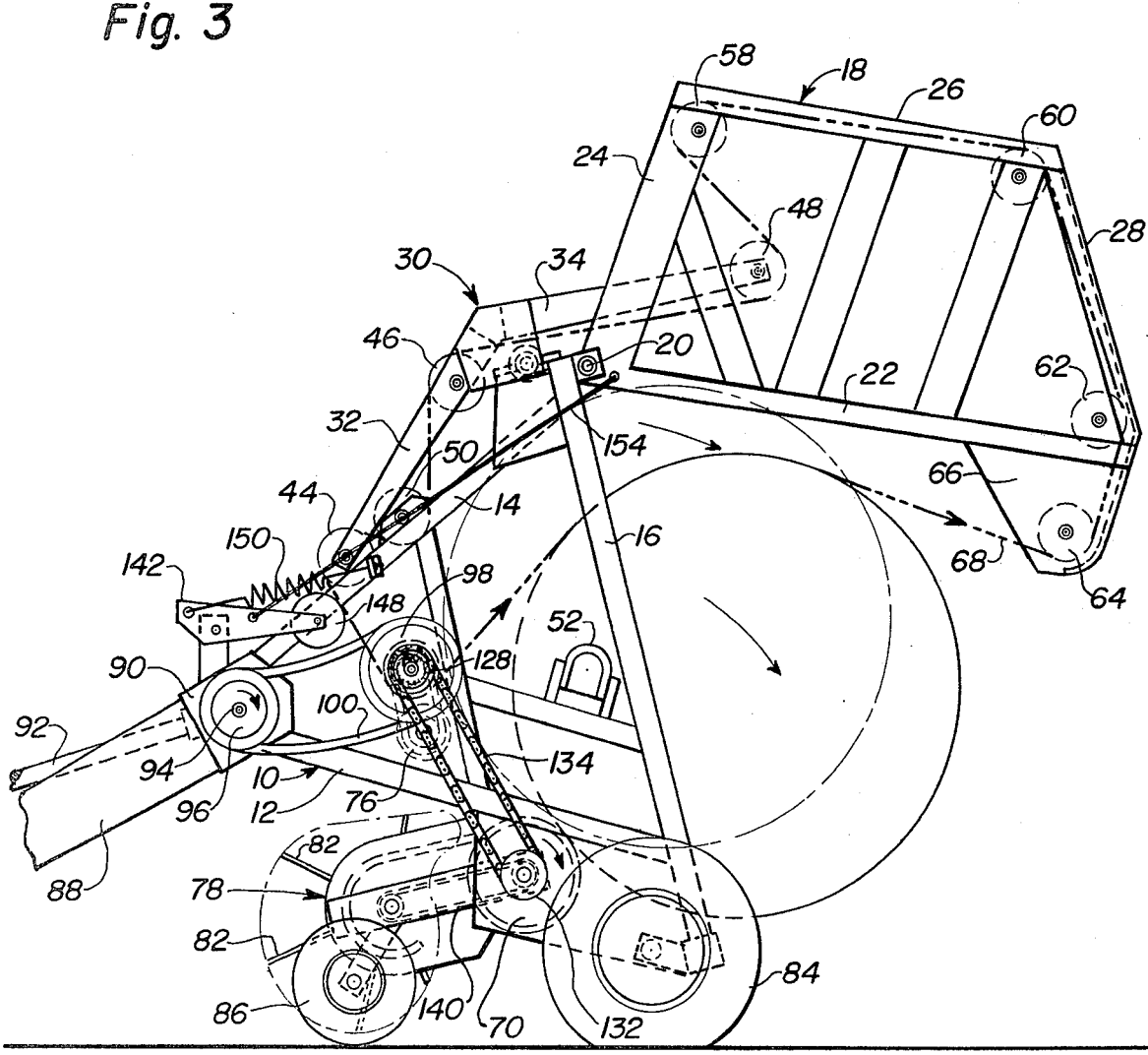
FIG. 3 is a side elevational view of the machine of FIG. 1 taken as the bale is being discharged from the machine.

Referring to FIG. 1, the roll baling machine embodying the present invention includes a base frame 10 having opposite sides each formed generally of frame members 12,14,16 rigidly connected in a triangular configuration with side plates substantially covering the space therebetween. A rear frame 18 is pivotally connected at 20 to the base frame 10 by suitable bearings. The rear frame 18 has opposite sides each formed generally of frame members 22,24,26,28 rigidly connected in a substantially trapezoidal configuration with side plates substantially covering the space therebetween. Other frame members (not shown) extend transversely of the machine and connect the opposite sides of the base frame 10 and the opposite sides of the rear frame 18. In FIGS. 1-3, the forward end of the machine faces to the left and rearward end thereof faces to the right.

A pair of hydraulic cylinders (not shown) may be mounted at the sides of the machine and connected between the base frame 10 and the rear frame 18. The hydraulic cylinders would be operated in known manner to move the rear frame 18 upwardly from its lower position shown in FIG. 1 to an upper position.

An arm assembly 30 is rotatably mounted on the base frame 10 and includes front arms 32 and rear arms 34 disposed inboard the sides of the machine. The front and rear arms 32, 34 are rigidly connected to a cross beam 36 that extends transversely of the machine. The arm assembly 30 also includes brackets 38 disposed inboard the sides of the machine. The brackets 38 fixedly support shafts 40 which are rotatably mounted in bearing members carried by brackets 42 on the opposite sides of the base frame 10. The arm assembly 30 is normally urged toward the position shown in FIG. 1 by conventional means such as extension or compression springs (not shown) connected between the arm assembly 30 and the base frame 10.

The arm assembly 30 carries rotatable guide members 44,46 on the front arms 32 and rotatable guide members 48 on the rear arms 34. The base frame 10 supports rotatable guide members 50 and cam guide members 52 inboard its opposite sides. Preferably, the cam guide members 52 are of the known type disclosed in U.S. Pat. No. 3,901,007 and designated therein by the numeral "118". Sprockets 54 are provided inboard the opposite sides of the base frame 10 and are fixed on a shaft 56 that is rotatably mounted in suitable bearings on the base frame 10. The rear frame 18 supports rotatable guide members 58,60,62,64 inboard its opposite sides. As best seen in FIG. 3, the guide members 64 are carried on brackets 66 projecting from the frame members 22 of the rear frame 18.

A flexible bale forming apron 68 is movably supported on the aforementioned guide members and sprockets following the path shown in FIG. 1 when the machine is empty. The apron 68 is preferably formed of a pair of endless link-type chains connected at spaced intervals by transverse bars or slats. The apron chains extend around and engage the various guide members and the sprockets 54. This apron 68 is of the known type disclosed in U.S Pat. No. 3,901,007 and designated therein by the numeral "82".

A floor roller 70 extends transversely of the machine and is rotatably supported by brackets 72 on the opposite sides of the base frame 10. Preferably, the floor roller 70 consists of a hollow metal drum with a coating or layer of rubber on its outer surface. When the machine is empty as seen in FIG. 1, the upper surface of the floor roller 70 cooperates with a course of the apron 68 that extends upwardly and rearwardly from the guide members 64 over the cam guide members 52 and then downwardly and forwardly to the sprockets 56 to define a bale chamber 74 having an initial wedge shape in side elevation. In this initial wedge shape, the forward end of the bale chamber 74 is narrower than the rearward end thereof. A stripper roller 76, preferably rubber coated, extends transversely of the machine and is rotatably supported on the opposite sides of the base frame 10. The stripper roller 76 is positioned at the forward end of the bale chamber 96 in close proximity to the apron 68.

A pickup header 78 extends transversely of the machine and is supported by brackets 80 on the opposite sides of the base frame 10. The pickup header 78 is preferably of conventional type having a series of projecting fingers 82 rotating in the path indicated for engaging and picking up windrowed crop material. A pair of wheels 84 mounted on the opposite sides of the base frame 10 support the machine. Another pair of wheels 86 are mounted to the brackets 80 to provide support primarily for the pickup header 78. A tongue 88 is provided on the forward end of the base frame 10 for connection to a tractor.

Figure 4:
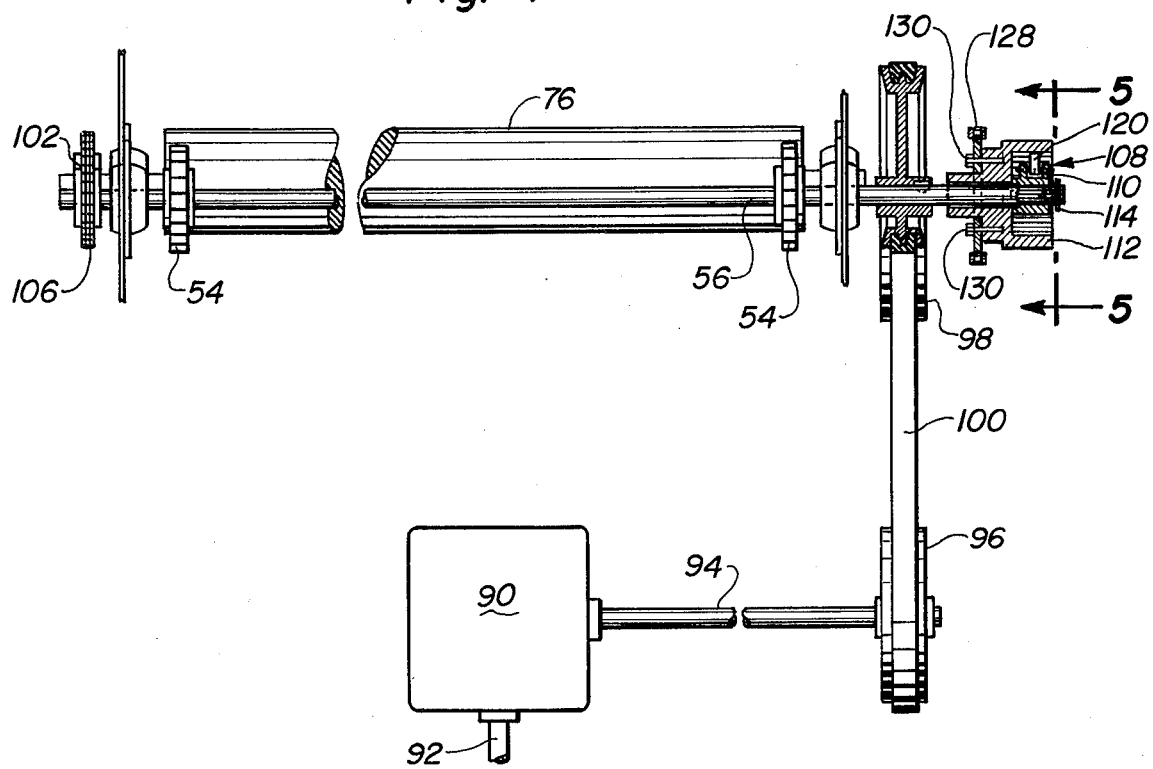
FIG. 4 is an enlarged plan view of part of the drive means of the machine.

A gear box 90 is mounted on the base frame 10. An input shaft 92 is connected at one end to the gear box 90, and the other end of the input shaft 92 is adapted for connection to the power take off unit (PTO) of a tractor (not shown). An output shaft 94, as also seen in FIG. 4, extends from the gear box 90 toward the side of the machine shown in FIG. 1 and has a sheave 96 fixed thereto. Another sheave 98 is fixed on the shaft 56 at the same side of the machine as the sheave 96, and a belt 100 extends around the sheaves 96 and 98. A sprocket 102, also seen in FIG. 4, is fixed on the shaft 56 at the other side of the machine and a sprocket 104 is fixed on the support shaft of the stripper roller 76, at the same side of the machine as the sprocket 102. A chain 106 extends around the sprockets 102 and 104 in order to drive the stripper roller 76.

Figure 5:
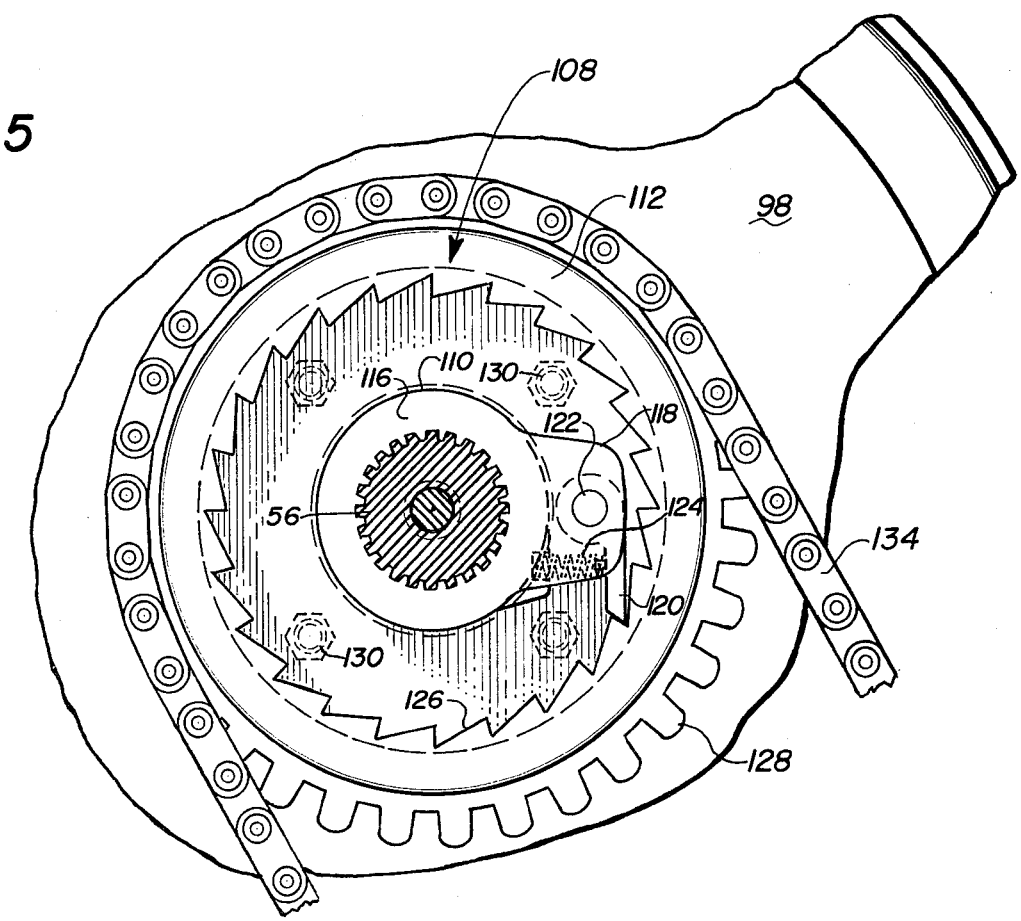
FIG. 5 is a view taken along the lines 5—5 of FIG. 4.

Referring now to FIGS. 4 and 5, a clutch mechanism 108 according to the present invention is mounted on the shaft 56 adjacent the sheave 98. The clutch mechanism 108 includes a driving member 110 fixed on the shaft 56 and a driven member 112 rotatably mounted on the shaft 56. The driving member 110 is splined on the shaft 56 and is held thereon by a retainer device 114. The driving member 110 includes a hub portion 116 and an arm portion 118. A pawl 120 is pivotally mounted on a pin 122 carried by the arm portion 118 of the driving member 110. A spring 124 is mounted between the pawl 120 and the hub portion 116 of the driving member 110. The spring 124 normally urges the free end of the pawl 120 toward a series of teeth 126 formed around an inner peripheral wall of the driven member 112. When the shaft 56 is rotated in a clockwise direction as viewed in FIG. 5, the free end of the pawl 120 is urged by the spring 124 into engagement with one of the teeth 126 in known manner so that the driven member 112 rotates with the driving member 110 in the clockwise direction. When the shaft 56 is rotated in a counterclockwise direction as viewed in FIG. 5, the free end of the pawl 120 successively slips over the teeth 126 in a known manner so that the driven member 112 does not rotate with the driving member 110 in the counterclockwise direction.

Referring now also to FIG. 1, a sprocket 128 is secured by bolts 130 to the driven member 112 of the clutch mechanism 108 so that it rotates with the driven member 112. A sprocket 132 is fixed on the support shaft of the floor roller 70, and a chain 134 extends around the sprockets 128 and 132 to drive the floor roller 70. Another sprocket 136 is mounted on the support shaft of the floor roller 70 adjacent the sprocket 132. A sprocket 138 is provided on the center drive shaft of the pickup header 78 on the same side of the machine as the sprocket 136, and a chain 140 extends around the sprockets 136 and 138 to drive the pickup header 78.

Referring again to FIG. 1, an arm 142 is pivoted by a pin 144 on a bracket 146 that is carried on the base frame 10. The arm 142 carries a rotatable sheave 148 in position for engaging the belt 100. A spring 150 is connected at one end to the arm 142 and at the other end to a bracket 152 on the frame member 14 of the base frame 10. A cable 154 is connected at one end to the arm 142 and at the other end to a pin 156 mounted on the rear frame 18. When the rear frame 18 is in its lower position of FIG. 1, the spring 150 pulls the arm 142 in a direction to firmly engage the sheave 148 with the belt 100. This tightens the belt 100 and provides a driving connection between the sheaves 96 and 98 via the belt 100. At the same time, the cable 154 is slack and thus has no effect on the arm 142. As the rear frame 18 is moved upwardly as shown in FIG. 3, the cable 154 is pulled tight and as a result pulls the arm 142 in a direction against the force of the spring 150 so that the sheave 148 is moved out of engagement with the belt 100. This allows slack in the belt 100, and the sheave 98 is drivingly disconnected from the sheave 96.

With reference to FIGS. 1 and 2, rotary driving power is delivered from the PTO of a tractor through the input shaft 92, the gear box 90, and the output shaft 94 to the sheave 96. This causes rotation of the sheave 96 in the direction indicated which in turn causes rotation of the sheave 98 in the same direction via the belt 100. Such rotation of the sheave 98 causes rotation of the shaft 56 and the sprockets 54 and 102 fixed thereto. Due to the clutch mechanism 108, this rotation of the shaft 56 causes rotation of the sprocket 128. The sprockets 54 drive the apron chains thereby propelling the apron 68 around the various guide members in the base frame 10 and the rear frame 18 in the direction and along the path indicated. The sprocket 128 drives the sprocket 132 via the chain 134 thereby rotating the floor roller 70 in the direction indicated. The sprocket 102 drives the sprocket 104 via the chain 106 thus rotating the stripper roller 76 in the direction indicated. The rotation of the floor roller 70 in turn causes rotation of the sprocket 136. The sprocket 136 drives the sprocket 138 via the chain 140 thereby rotating the fingers 82 of the pickup header 78 in the direction indicated. The various chains and sprockets may be sized so that the parts of the machine operate at any desired speeds. For example, the apron chains, the chain 134, and the sprockets 54, 128, 132 are preferably sized so that the peripheral speed of the floor roller 70 is equal to or slightly higher than the speed of the apron 68. This tends to keep a roll of crop material toward the rearward end of the machine during formation.

As the machine is pulled across a field by a tractor, the pickup header fingers 82 engage, pick up and deliver windrowed crop material onto the upper surface of the rotating floor roller 70 in the bale chamber 74. The crop material is carried upwardly and then coiled back downwardly onto itself by the apron 68 which moves upwardly and rearwardly from the guide members 64 over the cam guide members 52 and then downwardly and forwardly to the sprockets 54. This movement of the apron 68 in the bale chamber 74 effectively starts the core of the roll bale. The rotating stripper roller 76 removes crop material from the apron 68 at the forward end of the bale chamber 74 and delivers it back downwardly into the bale chamber 74. The roll bale increases in diameter lifting the inner course of the apron 68 that extends between the guide members 64 and the sprockets 54 off the cam guide members 52, and expanding the bale chamber 74 from its initial wedge shape to a substantially circular shape. The expansion of the bale chamber 74 results in movement of the inner course of the apron 68 into the rear frame 18. This movement of the apron 68 is accomplished by rotation of the arm assembly 30 in a counterclockwise direction from the position shown in FIG. 1. When a bale reaches its maximum diameter, a substantial amount of the inner course of the apron 68 is disposed inside the rear frame 18 and the arm assembly 30 is rotated to the position shown in FIG. 2.

When it is desired to discharge the completed bale from the machine, the rear frame 18 is raised upwardly as shown in FIG. 3. This stretches the inner course of the apron 68 across the space between the guide members 64 and the sprockets 54 thereby assisting the bale to exit the machine. The raising of the rear frame 18 also drivingly disconnects the sheave 98 from the sheave 96 in the manner explained above, thereby shutting off all power from the tractor PTO to the apron 68, floor roller 70, stripper roller 76, and pickup header 78. The bale rotates in a generally clockwise direction as viewed in FIG. 3 as it exits the machine. Such bale rotation causes the apron 68 to move in reverse direction. Because of the clutch mechanism 108, however, the floor roller 70 and the fingers 82 of the pickup header 78 do not rotate in reverse direction. This prevents damage to the pickup header 78. The floor roller 70 is free to rotate in its normal direction independently of the apron 68 to help in discharging the bale from the machine.

The following claims are intended to cover all modifications and variations of the preferred embodiments of the invention without departing from the spirit and scope of the invention.

Having thus described the invention, what is claimed is:

1. A roll baling machine comprising:
   (a) a frame;
   (b) a floor roller rotatably supported on said frame;
   (c) an apron movably supported on said frame and cooperating with said floor roller for forming a roll bale of crop material;
   (d) drive means connected between said floor roller and said apron for rotating said floor roller in response to movement of said apron in a first direction during bale formation; and
   (e) said drive means including clutch means for drivingly disconnecting said floor roller from said apron in response to movement of said apron in a second direction which is opposite said first direction so that said floor roller will no longer be rotated by said drive means when said clutch means drivingly disconnects said floor roller and said apron.

2. The roll baling machine defined in claim 1, further comprising:
   (a) pickup means movably supported on said frame for picking up crop material from the ground;
   (b) said drive means also connected between said pickup means and said apron for moving said pickup means in response to movement of said apron in said second direction so that said pickup means also will no longer be moved by said drive means when said clutch means drivingly disconnects said pickup means and said apron.

3. The roll baling machine defined in claim 1, wherein said clutch means comprises:
   (a) a driving member connected to said apron; and
   (b) a driven member connected to said floor roller.

4. The roll baling machine defined in claim 3, wherein said clutch means further comprises a pawl on said driving member engageable with teeth on said driven member.

5. The roll baling machine defined in claim 1, wherein said apron comprises endless flexible members and transverse members extending between and interconnecting said endless flexible members.

* * * * *